United States Patent [19]

Berns

[11] 4,005,413

[45] Jan. 25, 1977

[54] BUZZER CONSTRUCTION AND METHOD OF ADJUSTING THE SAME

[75] Inventor: Charles Berns, New Milford, Conn.

[73] Assignee: General Signal Corporation, Rochester, N.Y.

[22] Filed: Feb. 11, 1975

[21] Appl. No.: 549,111

Related U.S. Application Data

[62] Division of Ser. No. 431,802, Jan. 8, 1974, Pat. No. 3,864,823.

[52] U.S. Cl. ................................ 340/402; 340/401; 335/96; 29/593; 335/278; 29/602 R

[51] Int. Cl.[2] ...................... G01K 1/08; G08B 3/00

[58] Field of Search .......... 340/388, 401, 402, 403; 335/96, 252, 278; 29/593, 602

[56] References Cited

UNITED STATES PATENTS

| | | | |
|---|---|---|---|
| 3,631,480 | 12/1971 | Heap | 340/402 X |
| 3,864,823 | 1/1974 | Berns | 29/602 |

*Primary Examiner*—John W. Caldwell
*Assistant Examiner*—William M. Wannisky
*Attorney, Agent, or Firm*—Pollock, Vande Sande & Priddy

[57] ABSTRACT

A buzzer structure, of the type comprising a housing having a coil unit therein and an armature mounted for vibratory movement adjacent the coil unit, includes in one embodiment an integral portion of the housing which is bent inwardly into engagement with the coil unit to fix the spacing between the coil unit and housing, thereby to determine the dimensions of the gap between the coil unit and armature. In a further embodiment, the coil unit is mounted directly to a deformable, integral part of the housing which is bent inwardly to fix the spacing between the coil unit and an adjacent diaphragm. The spacing and gap dimensions are adjusted, after the buzzer elements are assembled, by energizing the coil unit, applying a force to a portion of the housing to progressively deform it to displace the coil unit in engagement therewith, and monitoring the magnitude of current flow through the coil unit while simultaneously monitoring the sound output of the buzzer to determine when a proper operating point has been reached, at which time the progressive deformation of the housing and displacement of the coil unit are immediately terminated.

6 Claims, 6 Drawing Figures

BUZZER CONSTRUCTION AND METHOD OF ADJUSTING THE SAME

CROSS-REFERENCE TO RELATED APPLICATION

This application is a division of my earlier application Ser. No. 431,802 filed Jan. 8, 1974, now U.S. Pat. No. 3,864,823.

BACKGROUND OF THE INVENTION

Various buzzer structures, adapted to be energized by AC and/or DC, are in themselves well known. Such buzzer structures typically comprise a coil unit associated with a vibratory armature mounted adjacent thereto. In the case of AC operation, the armature may constitute a permanent magnet adapted to be successively attracted to and repelled by the changing polarity poles produced in the AC energized coil unit or, if the armature has a comparatively small mass, the armature may comprise a strip of magnetic metal mounted on a spring and adapted to be successively attracted to one end of the coil unit at a frequency dependent upon the frequency of energization, e.g., a 60-cycle coil energization causes armature vibration at 120 cycles per second. In the case of DC operation, the armature is further associated with a contact pair which controls the energization circuit of the coil in well known fashion to successively make and break said energization circuit and thereby cause vibratory motion of the armature. The present invention is concerned, in general, with buzzers of these various different types.

In buzzer assemblies of the general types described above, proper operation of the buzzer depends, inter alia, on proper positioning of the coil unit and armature relative to one another, i.e., if the gap between these elements is too large the armature will not be attracted to the coil unit when the coil unit is energized. It is possible, of course to calculate precisely where the parts should be positioned relative to one another in dependence upon the parameters of the coil unit and armature and the operating conditons which are desired, and to carefully engineer and assemble the buzzer based upon such calculations. However an approach of this type, and the resultant precision in manufacture and assembly which it contemplates, is not economically justifiable when it is desired to provide a simple, comparatively inexpensive buzzer assembly; and in this latter case, the usual practice has been to mount the coil unit and armature in general proximity to one another within a housing, and then to manually adjust the positions of these elements relative to one another while observing the operating state of the buzzer thereby to establish the operating point of the buzzer. More particularly, it has been the practice heretofore to provide an adjustable set screw in the buzzer housing positioned to bear upon a portion of the coil unit and, with the coil energized but with the gap between the coil unit and armature too large to cause the armature to be attracted to the energized coil unit, to turn the set screw thereby to force the coil unit toward the armature until the gap has been reduced sufficiently to cause the buzzer to commence its operation, at which time the set screw is locked into place.

The prior art adjustment technique discussed above has a number of disadvantages. It requires, of course, the provision of a set screw and associated tapped hole in the housing which tend to increase the cost of the buzzer somewhat; and while the cost of these items is comparatively small, it may become significant in the case of an extremely inexpensive buzzer construction. In addition, the adjustment procedure, requiring the turning down of the set screw and the subsequent locking thereof into place, is comparatively slow and does not lend itself to an automated procedure. Moreover, the adjustment may not be as permanent as desired since there is always the possibility that an improperly locked screw may shake loose, in which event the dimensions of the gap between the coil unit and armature can change to render the buzzer inoperative.

The present invention obviates all of these disadvantages of the prior art.

SUMMARY OF THE INVENTION

In accordance with the present invention, the housing of a buzzer unit of the type described above is modified to eliminate the tapped hole and associated set screw and, instead, is formed with a pair of generally parallel, comparatively short slots therein which define, between the slots, a housing portion which is depressible or deformable toward the interior of the housing. This deformable portion of the housing is located adjacent the mounting positon of the coil unit so that, when a force is applied thereto from the exterior of the housing, the deformable portion is bent into a substantially V-shaped configuration which protrudes toward the interior of the housing in engagement with the coil unit to displace the coil unit. In another embodiment, the housing includes a plurality of short slots surrounding the mounting position of the coil unit itself to define, in the area surrounding the slots, a housing portion deformable toward the interior of the housing. Deformation of the deformable housing portion thereby performs the adjustment function of the prior art set screw arrangement described previously, but does so in a far more economical, efficient, and otherwise generally improved fashion. Adjustment is accomplished simply by applying a force to the deformable portion of the housing, thereby to bend said deformable portion toward the housing interior in progressively greater increments until the desired buzzer operating point is achieved, at which time the applied bending force is removed to leave the coil unit locked at its proper position by the deformed housing portion in engagement therewith. By this arrangement and procedure, the set screw and its tapped hole previously employed are eliminated and the manufacturing cost of the buzzer is accordingly reduced, proper adjustment is accomplished much more quickly and the adjustment is far more permanent than in the case of a set screw.

The improved buzzer arrangement of the present invention lends itself, moreover, to an automated adjustment procedure. More particularly, the adjustment can be effected by a selectively energizable motor which operates, through an appropriate gear box, to advance a tool which is in engagement with the deformable portion of the buzzer housing while the operating condition of the buzzer is monitored. In a preferred embodiment of the invention, the buzzer coil unit is energized at a voltage which is, for example, approximately 30% below its nominal or rated voltage, during the adjustment procedure; and the operating condition of the buzzer is monitored by sensing the magnitude of current flowing through the coil unit (the magnitude comparatively high until the buzzer starts operating, at which time it drops to a significantly lower value) and while simultaneously gear box, the sound output of the buzzer (which is initially silent and which starts to buzz as the adjustment proceeds). The mechanism employed to effect this monitoring procedure senses the current and sonic parameters simultaneously, and preferably includes means for adjusting the thresholds at which the current drop and sonic output increase are detected; and when the characteristic changes in both parameters are sensed, a logic circuit operates to reverse the energization to the motor thereby to immediately reverse the direction of rotation of the motor to return the depressing tool to its zero position.

The adjustment procedure is accordingly accomplished simply by aligning the tool with the depressible housing portion, thereafter energizing the motor, and permitting the motor to run first in its forward direction until the proper operating point of the buzzer has been achieved, at which time the motor drive immediately and automatically reverses to terminate the adjustment procedure.

BRIEF DESCRIPTION OF THE DRAWINGS

The foregoing construction, operation, and advantages of the present invention will become more readily apparent from the subsequent description and accompanying drawings in which.

DESCRIPTON OF THE PREFERRED EMBODIMENTS

Figure 1:
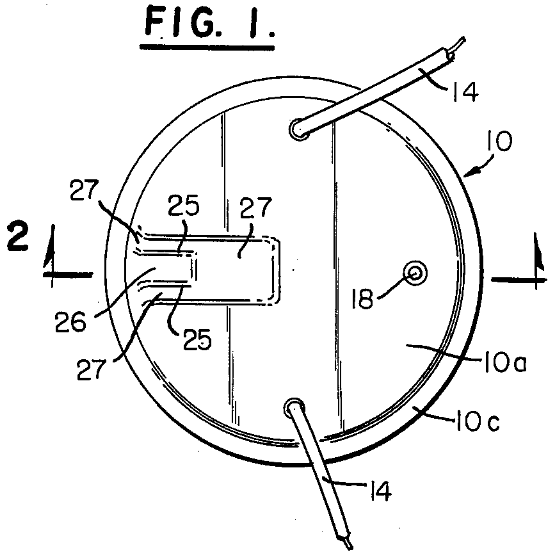
FIG. 1 is a top view of a buzzer housing constructed in accordance with the present invention.
Figure 2:
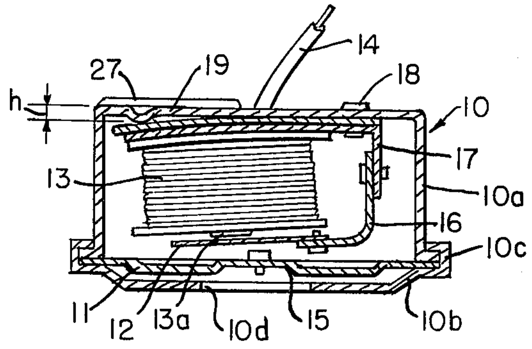
FIG. 2 is a vertical cross sectional view of the buzzer of FIG. 1, incorporating the adjustment structure of the present invention.

Referring initially to FIGS. 1 and 2, it will be seen that the buzzer of the present invention (which, except for the adjustment feature to be described hereinafter, is a prior art, commercially available structure) comprises a housing 10 having a cup-shaped upper portion 10*a* and an opposing lower closure portion 10*b* mechanically joined to one another at 10*c* and supporting therebetween, at its periphery, a disc-shaped diaphragm 11 adapted to produce a sonic output via an opening 10*d* in the lower closure portion. The diaphragm 11 is in turn associated with a buzzer mechanism, disposed within cup-shaped housing portion 10*a*, comprising an armature 12 which is mounted adjacent a coil unit 13 adapted to be electrically energized via lead 14 to effect vibratory motion of armature 12 to cause said armature to repetitively strike a stud 15 affixed to the center of diaphragam 11.

Figure 3:
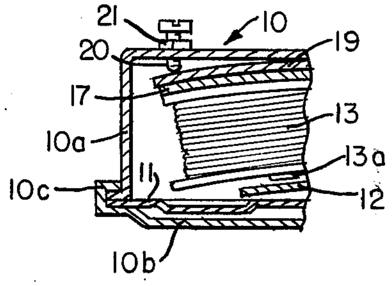
FIG. 3. (Prior Art)
FIG. 3 depicts a portion of the structure shown in FIG. 2, but with the prior art set screw adjustment incorporated therein.

Armature 12 takes the form of a strip of magnetic material having its free end disposed adjacent the core 13*a* of coil unit 13. The other end of armature 12 is attached to a spring 16 which is in turn secured to an L-shaped bracket 17 which is affixed to the upper side (as viewed in FIGS. 2 and 3) of coil unit 13. The entire buzzer unit, which is thus of unitary construction, is mounted on the base of cup-shaped housing portion 10*a* by means of a rivet 18, but with armature 12 and core 13*a* of coil unit 13 being electrically isolated from housing 10 by means of an intervening insulator 19.

Assuming for the moment that the gap between armature 12 and core 13*a* is of proper size, when coil unit 13 is energized with AC applied across leads 14, it causes armature 12 to be successively attracted to core 13*a* against the force of spring 16, and thus causes the armature 12 to vibrate between core 13*a* and stud 15, at a repetition rate which is twice the applied frequency, i.e., with 60 hz coil energization employed, the buzzer will sound at 120 hz. Alternatively, the buzzer may be caused to operate with DC energization by grounding housing 10 thereby to ground diaphragm 11 and its stud 15, by positioning armature 12 to normally engage stud 15, and by applying DC energization to coil 13 through the contact set provided by stud 15 and armature 12 in accordance with known DC buzzer techniques.

When the buzzer unit, comprising interconnected coil unit 13 and its associated armature 12, is initially assembled, it is conventional in the art to provide a gap between the coil unit and armature which is too large to permit the buzzer to operate and thereafter to reduce the size of this gap by an adjustment procedure, effected after the buzzer has been assembled, which adjusts the buzzer to its proper operating point. More particularly, it has been standard practice to mount the buzzer unit within cup-shaped portion 10*a* of housing 10 with the upper side of its coil unit initially being in close proximity to and in substantially flush engagement with, the interior of the base of housing portion 10*a*, and to provide said base with an adjustment set screw 20 (see FIG. 3) disposed within a tapped hole in said base for engagement with the flush mounted buzzer unit at a position comparatively widely spaced from its mounting rivet 18. With coil unit 13 energized, e.g., at a voltage approximately 30% below nominal or rated voltage, screw 20 is turned down to cause energized coil 13 to be moved progressively away from the interior of the base of housing portion 10*a* about mounting rivet 18, thereby to successively reduce the gap between coil unit 13 and armature 12; and when the buzzer starts to operate, set screw 20 is locked into place e.g., by means of a lock nut 21 or by the application of an appropriate cement compound thereto. This conventional adjustment procedure requires that the buzzer housing be provided with a set screw and an associated tapped hole, further requires the provision of means for locking the set screw at its adjusted position and involves a comparatively time consuming manual adjustment procedure, all of which necessarily increase the cost of the buzzer unit. Yet the resultant adjustment may be less permanent than desired since there is always the possibility that, in use, the set screw may work free or become unlocked, causing the buzzer to go out of adjustment and become inoperative. The present invention obviates all of the disadvantages of the prior art.

In accordance with the present invention, instead of using a set screw such as 20, the base of cup-shaped housing portion 10*a* is provided with a pair of comparatively short, parallel, spaced slots 25 (see FIG. 1) which define therebetween a deformable housing portion 26 located at generally the same position in the overall assembly as was previously associated with set screw 20. The resultant somewhat weakened portion of the housing is reinforced by forming the base of cup-shaped portion 10*a* with outwardly protruding reinforcing ribs 27 in partially surrounding relation to deformable portion 26.

Deformable portion 26 is located in comparatively widely spaced relation to mounting rivet 18 at a position directly adjacent the coil unit 13. When it is desired to adjust the buzzer to its operating point a force applied to the deformable housing portion 26, from the exterior of the housing directed toward the interior of the housing deforms said portion 26 into the generally V-shaped configuration shown in FIG. 2, and as this deforming force continues to be applied, the depth *h* of the V-shaped depression increases to successively displace coil unit 13 away from the interior of the base of housing portion 10*a* thereby to reduce the gap between coil unit 13 and armature 12. When the depth *h* of the depression becomes sufficiently large to set the buzzer unit to its desired operating point, the deforming force is removed from housing portion 26 to leave the coil unit 13 at its then adjusted position relative to armature 12 and, without any subsequent locking procedure, the component parts of the buzzer assembly remain locked in proper position relative to one another by the permanently depressed housing portion 26 during subsequent use of the buzzer mechanism.

The use of a deformable housing portion 26 simplifies the construction of the housing structure itself, reduces its cost by eliminating the set screw and associated tapped hole previously considered necessary, reduces the time needed to adjust the buzzer to its proper operating point, and produces a more permanent adjustment. In addition, the modification of the present invention adapts the entire structure to an automatic adjustment procedure which has not been possible heretofore. This additional aspect of the present invention will be described with reference to FIG. 6.

Figure 4:
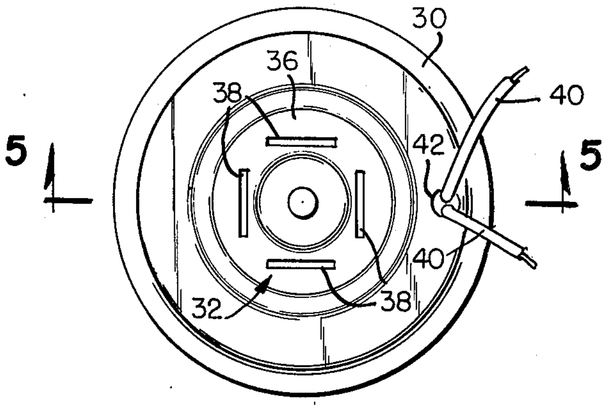
FIG. 4 is a top view of a further embodiment of a buzzer housing constructed in accordance with the present invention.

FIG. 4 shows a top view of a buzzer housing incorporating a second embodiment of the invention. The cylindrical housing 30 includes on its upper surface a centrally located depression 32 at the center of which an attachment rivet 34 is attached. The bottom surface 36 of depression 32 is readily deformable due to the presence of a plurality of slots 38 surrounding centrally located rivet 34, which extend through the thickness of the wall of housing 30. Although four symmetrically placed slots 38 are shown, more or less may be used to provide the desired deformability; however symmetrical arrangements are preferred. Electrical leads 40 are brought out of housing 30 through an aperture 42, in the well-known manner.

Figure 5:
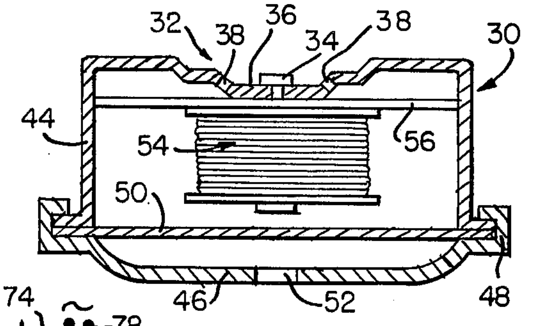
FIG. 5 is a section view taken along line 5—5 of FIG. 4.

In FIG. 5, housing 30 is seen to comprise a cup-shaped upper portion 44 and an opposing lower closure portion 46 mechanically joined to one another at 48 and supporting therebetween a disc-shaped diaphragm 50 of magnetic material which is adapted to produce a sonic output via an opening 52 in closure portion 46. Diaphragm 50 is associated with a driver coil unit 54 disposed within the cup-shaped portion 44. Coil unit 54 is mounted upon an insulating circuit board 56, which may also support any additional circuit elements required for the operation of the coil unit to create the desired buzzing. Rivet 34 joins coil unit 54 to circuit board 56.

When it is desired to adjust the buzzer shown in FIGS. 4 and 5 to its operating point, a force is applied to deformable bottom surface 36 from the exterior of the housing directed toward the interior of the housing. This deforms surface 36 as indicated in FIG. 5 to displace coil unit 54 toward diaphragm 50. As deformation occurs, the top of coil unit 54 remains essentially parallel to diaphragm 50, due to symmetrically placed slots 38. When the deformation is sufficiently large to set the buzzer unit to its desired operating point, the deforming force is released. The structure of the invention facilitates an automatic adjustment procedure, as will not be discussed with regard to FIG. 6.

Figure 6:
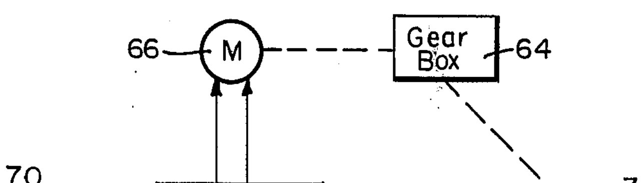
FIG. 6 is a schematic diagram of an automatic adjustment mechanism used in conjunction with a buzzer of the type shown in FIG. 2 and FIG. 5 to practice the automatic adjustment procedure of the present invention.
Figure 6:
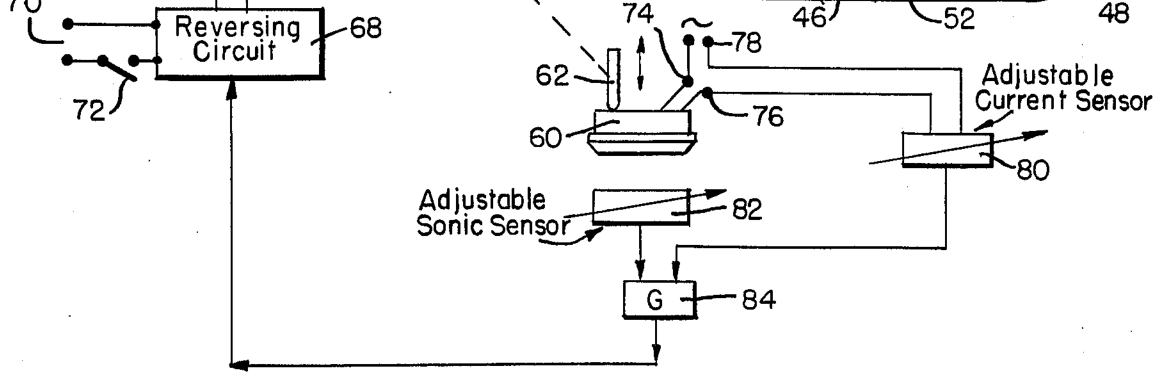

As shown in FIG. 6, a buzzer 60, constructed as shown in FIGS. 1 and 2 or 4 and 5 may be located at an adjustment station with its deformable housing portion 26 or 36 underlying a depressing tool 62. Tool 62 may in turn be moved in translation by a gearing mechanism 64 which is driven by a reversible motor 66, and motor 66 is in turn energized through a reversing circuit 68 from a power supply 70 having an on-off switch 72. The coil leads of buzzer unit 30 are connected to terminals 74, 76 thereby energizing the coil at a potential approximately 30% below nominal or rated voltage from source 78, and which further functions to insert an adjustable current sensor 80 in series with the buzzer coil.

A sonic sensor 82 is disposed in facing relation to the sound emitting orifice 52 or 10*d* of the buzzer to determine when buzzer 60 commences producing a sound output. Sonic sensor 82 is preferably arranged to provide an adjustable threshold, so that it can be set for an optimum db output corresponding to the optimum adjustment point of buzzer 60, and adjustment of current sensor 80 similarly permits sensor 80 to be set to a current level which also represents an optimum operating conditon. The outputs of the sensor 80 and 82 are coupled as two inputs to an AND gate 84 the output of which is coupled to reversing circuit 68.

Assuming for the moment that depressing tool 62 is in its zero position, and that the coil of buzzer 60 is energized from source 78, closure of switch 72 energizes motor 66 through reversing circuit 68 to cause the motor to commence operating in a forward direction, thereby to move tool 62, via gear box 64, in a direction toward the interior of the buzzer housing. This in turn causes deformable housing portion 26 or 36 to be depressed by successively greater amounts, and simultaneously causes displacement of the coil unit 13 or 54 within the buzzer toward the proper operating point of the buzzer. When the proper operating point has been reached, as monitored by the optimum db output sensed by sensor 82 and by a significant reduction in coil current to a desired optimum value as sensed by senor 80, the signals simultaneously applied to gate 84 cause the gate output to activate reversing circuit 68 e,.g., to energize a relay in said circuit. This reverses the polarity of energization of motor 66 and causes it to immediately withdraw depressing tool 62 toward its zero position. Thus once the automatic adjustment mechanism of FIG. 6 is set into operation, the buzzer is progressively adjusted toward its operating point; and once the optimum point of adjustment is achieved, as monitored by the current flowing through the buzzer coil and by the sound output of the buzzer, all further adjustment is immediately terminated and the system is returned to its starting point.

While I have thus described preferred embodiments of the present invention, many variations will be apparent to those skilled in the art. It must therefore be understood that the foregoing description is intended to be illustrative only and not limitative of the present invention and all such variations and modifications as are in accord with the principles described are meant to fall within the scope of the appended claims.

Having thus described my invention I claim:

1. A buzzer assembly comprising a housing, an electrically energizable coil unit mounted within said housing with one side of said coil unit being adjacent an interior wall of said housing, and diaphragm means within said housing mounted for vibratory motion adjacent said coil unit on the side of said unit remote from said interior wall, a deformed portion of said interior wall being bent away from the adjacent portion of said interior wall to protrude inwardly of said interior wall into engagement with said coil unit, said deformed portion thereby defining the spacing between said one side of said coil unit and said interior wall of said housing to define in turn the dimensions of the gap between the other side of said coil unit and said diaphragm means.

2. The buzzer assembly of claim 1 wherein said housing is fabricated of metal and includes a pair of substantially parallel slots of extending through a wall thereof, said deformed portion of said interior wall being located between said slots and being bent in a substantially V-shaped configuration toward the interior of said housing.

3. The buzzer assembly of claim 2 wherein said housing has integral reinforcing ribs located adjacent said slots and protruding outwardly of said housing.

4. The buzzer assembly of claim 1, wherein said housing is fabricated of metal and includes a plurality of slots extending through a wall thereof, said deformed portion of said interior wall being located among said slots and being deformed toward the interior of said housing.

5. The buzzer assembly of claim 4, wherein said coil unit is mounted to said wall centrally among said plurality of slots.

6. The buzzer assembly of claim 5, wherein said slots are arranged symmetrically around the mounting location of said coil unit.

* * * * *